United States Patent
Salvadorini

[11] 3,894,605
[45] July 15, 1975

[54] THERMO-ELECTRICALLY PROPELLED MOTOR-VEHICLE

[76] Inventor: Rolando Salvadorini, Via Ventimiglia 98, Turin, Italy

[22] Filed: Mar. 12, 1973

[21] Appl. No.: 340,063

[30] Foreign Application Priority Data
Mar. 16, 1972 Italy .................. 67832-A/72

[52] U.S. Cl. .................. 180/65 R; 73/229; 340/59
[51] Int. Cl. .................. B60l 11/00
[58] Field of Search .......... 180/65 R, 65 A; 73/229, 73/231 R; 340/59, 77, 105, 142

[56] References Cited
UNITED STATES PATENTS

| | | | |
|---|---|---|---|
| 2,078,362 | 4/1937 | Arendt | 180/65 R X |
| 2,581,596 | 1/1952 | Nims | 180/65 R |
| 3,171,505 | 3/1965 | Imelmann | 180/65 |
| 3,190,387 | 6/1965 | Dow | 180/65 R |
| 3,477,537 | 11/1969 | Plishner | 180/65 R |

*Primary Examiner*—David Schonberg
*Assistant Examiner*—David M. Mitchell

[57] ABSTRACT

A motor vehicle with thermoelectrical drive, having driving means comprising a turbine which actuates an alternator feeding, through a set of rectifiers, at least one direct current electromotor providing for the vehicle traction. A buffer storage battery, connected to the supply of the motor(s), actuates said motor in alternative or in addition to the alternator actuated by the turbine, so that the vehicle may be also only electrically driven. The vehicle may be provided with a device, operatively connected to the turbine, and measuring in particular circumstances the pollution produced by the turbine when this is operating.

9 Claims, 12 Drawing Figures

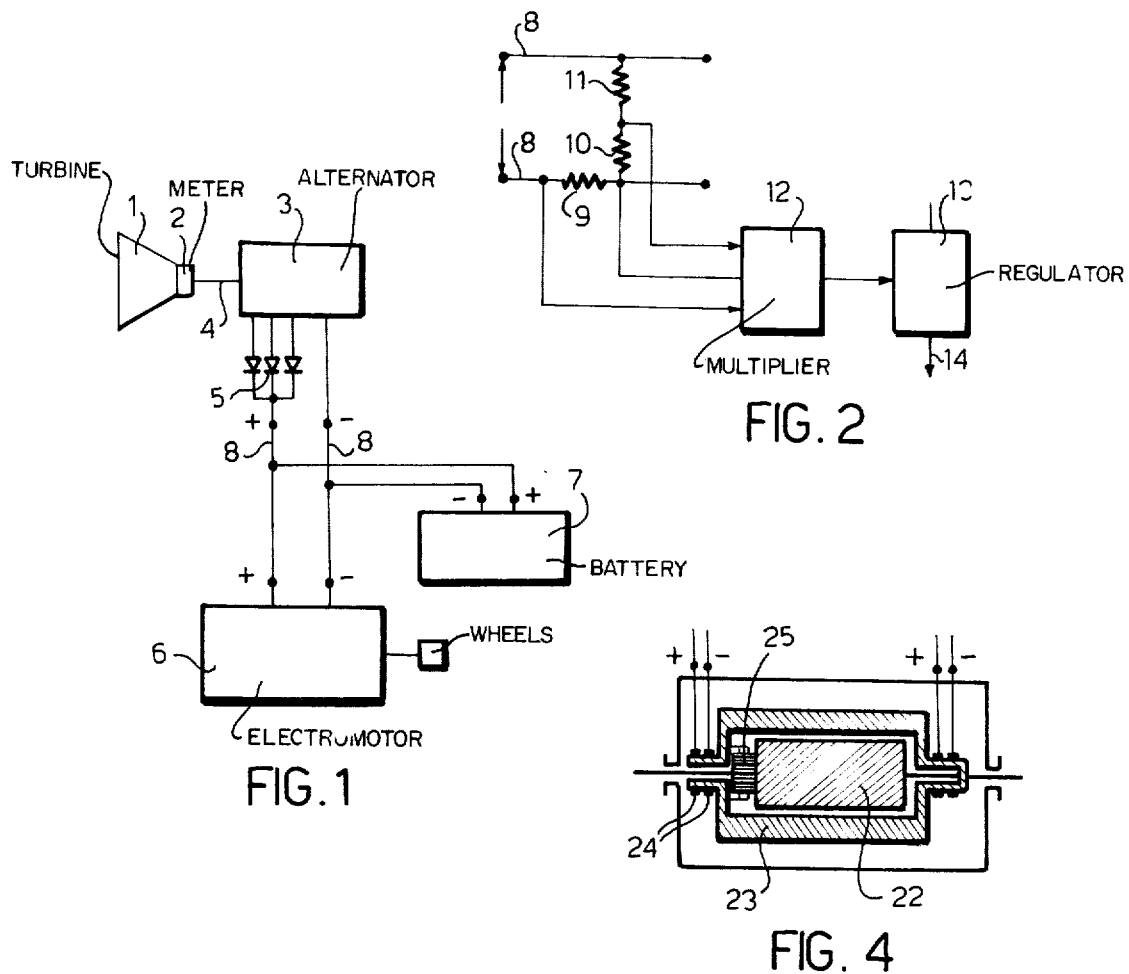
FIG. 2
FIG. 1
FIG. 4
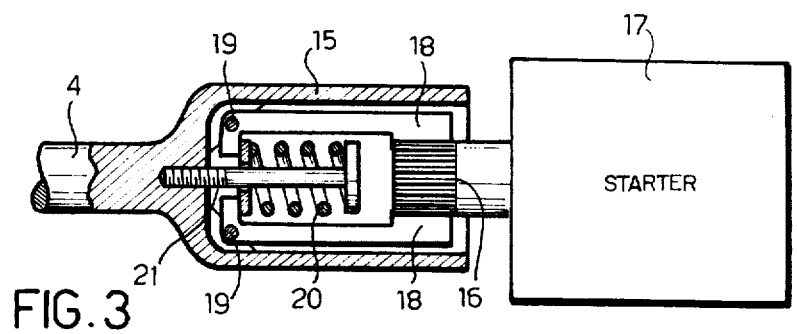
FIG. 3

THERMO-ELECTRICALLY PROPELLED MOTOR-VEHICLE

The present invention relates to a thermo-electrically propelled motor vehicle.

Cars with electric motors are known, which have been studied or realized in order to avoid or reduce the air pollution caused by the traffic in the towns. In such known cars the electric motor is fed by storage batteries which obviously have to be periodically recharged. Since the energy capacity per Kg of the present batteries is very low, such cars, in order to keep the battery weight within acceptable limits, have a rather reduced power and a limited range; moreover, since the battery recharge takes a rather long time, it is evident that such cars are not suitable for long distances and therefore they can be used almost only in the towns.

On the contrary the invention provides a motor car, or more generally, a motor vehicle, with thermoelectrical drive, which may act as a normal electric car in the towns, and in which the provision of the thermal engine allows to recharge the storage batteries and to feed directly the electric motor, so that high powers and great ranges may be achieved, and the car may be more completely exploited.

The car according to the invention is characterized in that it has a driving means comprising a thermal engine, more particularly a turbine, which is directly coupled to an electric generator, more particularly an alternator, preferably of the kind with a rotary bipolar inductor, which feeds through a set of rectifiers one or more d. c. electromotors which provide for the vehicle traction. A buffer storage battery is connected to the direct voltage supply of the motors and provides for the feeding of the motors in substitution or in addition to the turbine.

The turbine may be of the gas or stream type, but in any case it has a constant speed and may operate with constant or varying load. Its starting may be obtained through a starter, or by causing the alternator to operate temporarily as a motor.

A single electric motor may be used for all wheels of the car, or one motor may be provided for each wheel. In the case of a single motor, this one might be of conventional type requiring the provision of a differential gear on the axle of the driving wheels, or it may be of the type with both the field and the armature rotating, so that the motor itself acts as a differential gear.

When more motors are used, suitable switches, controlled by a level placed on the dashboard, allow to couple said motors in series and/or in parallel, one by one or by groups.

Advantageously, for some particular uses, the car may be provided with a meter, hereinafter called "pollution meter" which measures the time during which the turbine has been operating. This meter may be used for instance in towns having a zone where the pollution is forbidden, which zone may be entered only by displaying on the car a suitable meter which may be used for requiring the payment of a fee depending upon the produced pollution.

According to a preferred embodiment of the invention, said meter may be actuated by the exhaust gases of the turbine, and may for instance comprise a vane wheel placed in the exhaust pipe, and apt to rotate a small current generator which feeds an electric clock with an integrator whose numerator measures and displays the time of operation of the turbine.

According to another embodiment, the meter may be actuated by the fuel entering the turbine, which fuel rotates a shaft whose motion may be imparted to said integrator with numerator through an idle wheel actuated from the dashboard.

In both cases the meter may be electrically preset for operation, for instance through a key which, when depressed, may energize a solenoid which generates, by means of a movable core, the rotation of a shaft, integral with said core and connected to a switch connected to the feeding circuit of the clock or respectively apt to determine the displacement of said idle wheel.

Further characteristics and advantages of the invention will clearly result from the following description, with reference to the accompanying drawings, in which:

FIG. 1 is a basic scheme of the thermoelectric drive of the vehicle according to the invention;

FIG. 2 is a basic diagram of the constant power regulator of the turbine;

FIG. 3 shows a self-engaging joint for the starting of the turbine;

Figure 5:
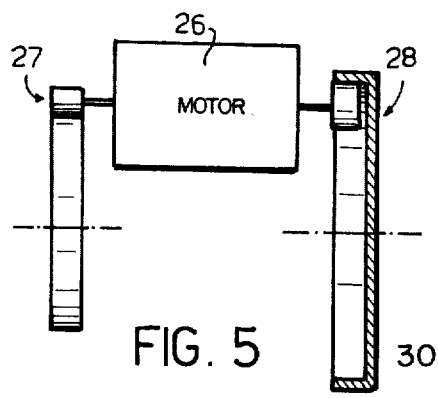
Figure 6:
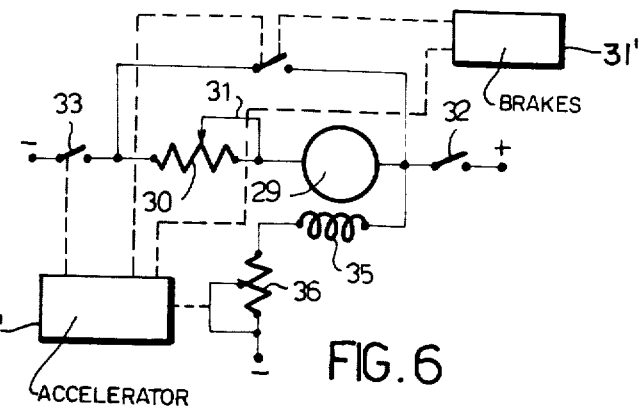
Figure 7:
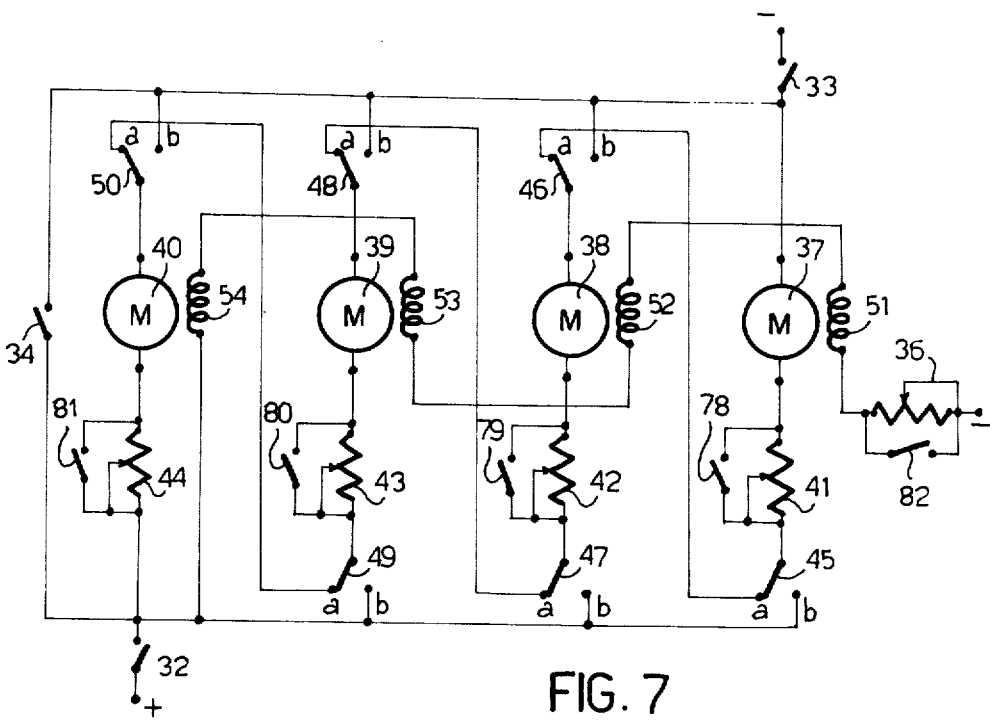
Figure 8:
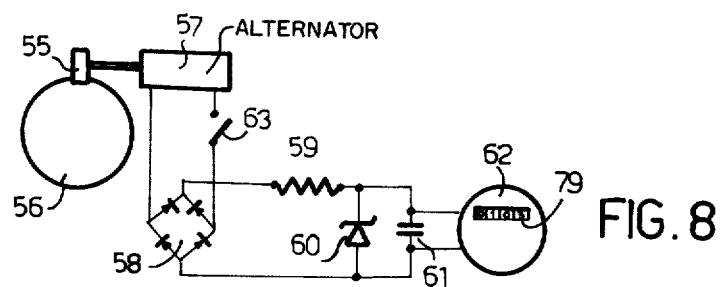
Figure 9:
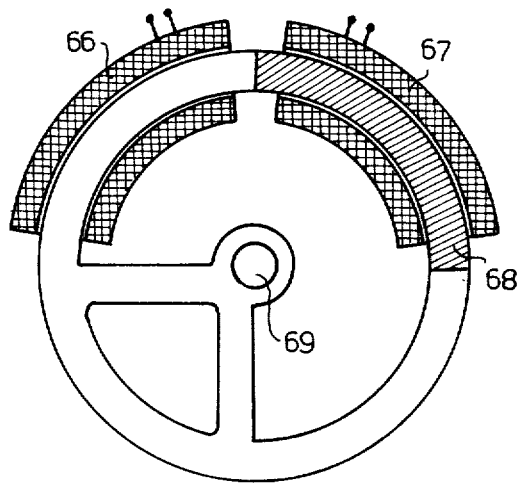
Figure 10:
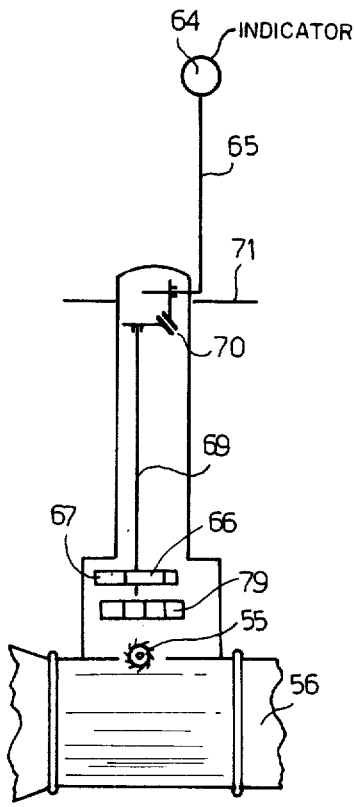
Figure 11:
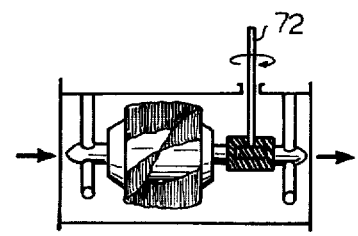

FIG. 4 diagrammatically shows an electric motor with double rotor;

FIG. 5 shows an exemplary reversible reduction unit for transmitting the motion from the motor with double rotor to the wheel axles;

FIG. 6 is the basic electric diagram of an electric car with a single electromotor;

FIG. 7 is the basic electric diagram of an electric car with four electromotors;

FIG. 8 is the basic diagram of a possible pollution meter, of electric type;

FIG. 9 shows a solenoid means for actuating the meter of FIG. 8;

FIG. 10 shows a possible arrangement of the meter in the car;

FIG. 11 shows a second embodiment of pollution meter; and

Figure 12:
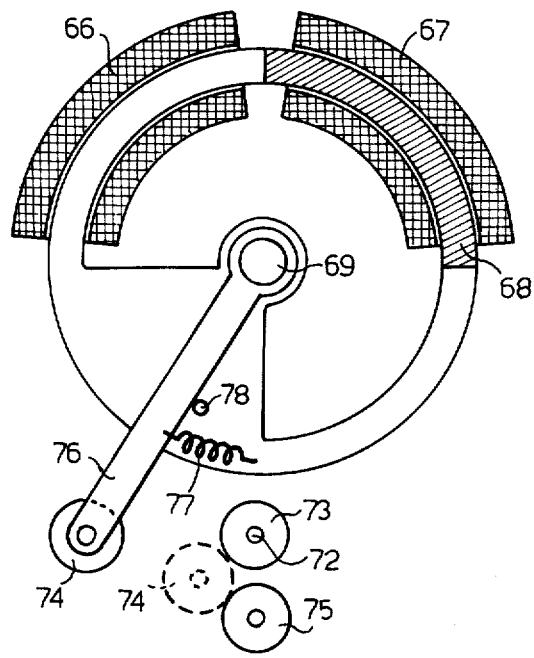

FIG. 12 shows the electro-mechanical means for actuating the meter of FIG. 11.

As shown in FIG. 1, the thermoelectric drive of the car of the invention may comprise a turbine 1, directly coupled through th driving shaft 4 to the alternator 3 whose output, rectified by the rectifying device 5, for instance a rectifier employing silicon diodes, feeds one or more electromotors 6, which provide for the traction of the vehicle, shown as controlling the wheels.

To the rectified output of rectifiers 5 is connected a buffer storage battery 7.

For some particular use of the car according to the invention, the turbine 1 may be connected with a pollution meter, shows at 2, whose features will be described later on.

By means of the driving means shown in FIG. 1, the car may be propelled only electrically, with motor(s) 6 fed by battery 7, or it may be thermoelectrically propelled, in which case the turbine 1 feeds the motor(s) 6 and charges the battery. In case of thermoelectrical drive, the battery 7 will feed alone the motors for the time required for reaching the operation pressure. In some particular cases, and only for short times, for instance overtakings or emergencies, the double supply both by turbine and by battery, will be operating, so that the car may have a maximum momentary power, greater than that of the turbine.

The turbine 1 may be a gas or a steam turbine. In this latter case preferably the turbine is of the closed circuit type, and the time required for the operating pressure of the steam to be reached is not a very important factor, since in the meanwhile the power may be provided by the battery.

In any case the turbine is kept at constant speed, and its load will be varied depending upon the current requested from the alternator. Preferably however the turbine 1 has both a constant speed and a constant load.

In this latter case an automatic device will stop the turbine when the current requested from the alternator becomes lower than a certain limit (completely charged battery) and the car is electrically driven until the battery has somewhat discharged. At this moment the turbine becomes again operative, and its power is shared between the electromotors and the battery. The automatic device could include, by way of example, the selector network of U.S. Pat. No. 3,477,537 which interconnects the motor to the battery or turbine. Instead of having the selector controlled by a tachometer, however, it would be controlled by a battery charge detector such as a battery voltage level detector described in U.S. Pat. No. 3,533,064. The time for recharging the batteries will obviously depend upon the power requested by the motor(s). The automatic device for starting and stopping the turbine may be disconnected if it is desired or required to use only the electrical drive.

An automatic regulator acting upon the excitation current of the alternator may be provided for obtaining the constant load operation. The basic scheme of an advantageous embodiment of such a regulator is shown in FIG. 2, where it is shown that a very low resistance 9 is connected in one of leads 8, downstream of rectifier 5, and that a choker comprising resistors 10 and 11 is connected in parallel between said leads 8. The voltage drops across resistors 10 and 9, respectively proportional to the voltage and the current delivered by the alternator, are sent to a multiplier 12 whose output, proportional to the power delivered by the alternator, is sent to a regulator 13, which regulates the excitation current of the alternator passing in the circuit 14 so as to keep constant the delivered power.

The multiplier 12 and the regulator 13 may be of any known type, and therefore will not be described in detail.

The use of the turbine with constant both speed and load allows important design simplifications in the turbine, and further affords a higher and more constant efficiency.

The turbine may be automatically started by means of a d.c. starter which engages the driving shaft 4 thereby rotating the turbine-alternator assembly and is disconnected when the steady speed is reached.

The joint between the starter and the driving shaft may be of centrifugal type, such as the one shown in FIG. 3. In such embodiment the driving shaft 4 has a hollow enlarged portion 15 which is the seat for a portion 16 of the shaft of a starter 17. Jaws 18, pivotally mounted by means of pins 19 on suitable bearings within portion 15, are thrusted against shaft 16 by a spring 20 carried by a rod 21 integral with the driving shaft 4. Advantageously jaws 18 and the shaft portion 16 will be provided with friction surfaces of suitable material.

With a joint of the described type, in order to start the turbine, the starter 17 is actuated, and trails shaft 4 and then the turbine and the alternator; when the turbine begins working, the speed increases and the jaws 18 will pivot about pins 19 because of the centrifugal force overcoming the action of spring 20, so that the joint is disconnected.

In alternative, the turbine may be started by causing the alternator 3 to act as a motor. In this case an inverter d.c. - a.c. must be connected in the alternator circuit, and a resistor must be connected across the field, in order that the alternator may act as an asynchronous motor.

Preferably the rectifier is realized by means of SCR diodes, and, if desired, the circuit may be modified so as to employ such diodes as rectifiers when the turbine is operating, and as inverters at the starting.

It is also possible to eliminate the characteristic hiss of the turbine by rendering it supersonic. In fact the turbine wheels, in case of not too high powers, have a very small diameter and the number of revolutions thereof may be increased. For instance, by using a speed of 50,000 r.p.m. and 20 vanes for each wheel, a frequency of 17 KHz is obtained, which cannot be heard. The same occurs with 25,000 r.p.m. and 40 vanes in each wheel. The turbine - alternator assembly, being very speedy, has very small size and weight.

At the high speeds which may be reached by the turbine, and then at the rather high frequencies generated by the alternator, which advantageously is of the three-phase type with rotary *bi* polar field, particular care may be paid to the armature lamination in order to limit the eddy currents. In the case of the alternator being used as an asynchronous motor for starting the turbine, it will be necessary to laminate also the field.

The car traction may be obtained by a single d.c. electromotor, or by as many electromotors as there are vehicle wheels.

When a single motor is used, the conventional arrangement with a differential gear may be used for transmitting the driving power to the wheels. Preferably however an electromotor with double rotor may be used, which allows avoidance of the use of a differential gear.

Such a motor is shown in FIG. 4, and comprises an armature 22 and an field 23 rotating in opposite directions. The current will be sent to the armature through two rings 24 and through the assembly 25 comprising the usual brushes and commutator. The field too will be supplied with excitation current through two rings.

With such a motor, when one of the two portions slows down the other speeds up, and, in the extreme case of one portion stopping, all speed is transferred to the other portion, that is the motor acts as a conventional motor with a single rotor. This operation exactly corresponds with that of the known mechanical differential gear, which, with the above described motor, may be dispensed with.

The coupling of such a motor with the driving wheels may be made by means of a device such as that shown in FIG. 5, wherein the motor with double rotor, diagrammatically shown by block 26, is connected to the two reduction units 27, 28 having the same gear ratio and allowing to reverse the motion of one portion for trasmission to the driving wheels.

The motor may be of the type with excitation in series, which has the advantage of a greater starting torque, but requires the inversion of the connections between inductor and armature when the motor becomes operating as a generator (regenerative braking in the descents): for these reasons FIGS. 6 and 7 show the type with independent excitation, and having a separate excitation source.

As shown in FIG. 6, the motor 29 has a terminal connected to one end of a variable resistance 30, whose slider 31 is controlled by the accelerator 30' and brake pedals 31' in the car. The other terminal of motor 29 is connected in series with a switch 32, while a second switch 33 controlled by the accelerator 30' is connected in series with the other end of the variable resistance 30. A switch 34 is arranged in parallel with motor 29 and the variable resistance 30, and the point common to motor 29 and switches 32 and 34 is connected to the excitation coil 35, which is serially connected with a variable resistance 36 similarly controlled by the accelerator 30'.

The operation of the above described motor is as follows: the driver, at the starting, closes from the dashboard switch 32. As long as the accelerator pedal is completely up, the switch 33 remains open, and therefore the car remains stationary. By slightly depressing the accelerator pedal, switch 33 is closed and the whole resistance 30 remains in the circuit, this resistance being progressively cut out by further depressing the pedal. The closing of switch 33 allows the starting of the car, and the progressive cut out of resistance 30 allows to increase the speed. When resistance 30 is completely cut out, the accelerator pedal may possibly have still a further run in which it begins progressively inserting resistance 36, so that consequently the excitation current decreases and the speed further increases.

To stop the car, the above operations will be repeated invertedly, that is the raising of the accelerator pedal gradually cuts out resistor 36, then inserts resistor 30 and lastly the complete raising will cause switch 33 to open and the driving action of the motor to stop.

In case of braking, firstly the brake pedal acts to close switch 34 so that the motor acts as a generator with load 30. By further depressing the brake pedal, the value of resistance 30 is decreased, thereby increasing the electrodynamic braking action.

When resistance 30 is actuated by the brake, its value should not decrease below a predetermined minimum value in order to avoid overheating of the motor. By further depressing the brake pedal, the conventional friction hydraulic brakes are actuated which, in order to prevent the wheels from blocking, should become operative only at low speed, when the electrodynamic brakes are no longer efficient. To this end centrifugal means might be provided which prevent the actuation of the friction brakes until the speed is decreased below a certain limit.

As shown in FIG. 7, instead of a single motor four motors 37 – 40 may be provided, each one connected with a car wheel. The motor group is arranged between switches 32, 33, and in parallel with switch 34.

The excitation of the motors is obtained by means of coils 51 to 54 in series with one another and with the variable resistance 36, and independently connected with the voltage supply.

The four motors are each connected in series with a variable resistance, 41 to 44 respectively, which resistances may be short-circuited by switches 78 to 81 respectively. A switch 45 is connected in series with the variable resistance 41; the two central motors 38, 39 and the resistors 42, 43 in series therewith are connected with the movable contacts of switches 46, 47 and 48, 49, and the movable contact of a further switch 50 is arranged in series with motor 40. Switches 45 to 50 are two-way switches and their fixed contacts are designed with $a$, $b$ in the drawing: said switches in their position $a$ connect the motors in series, whereas in position $b$ they connect the motors in parallel. The status of said switches is controlled for instance through a small lever placed on the dash-board and operated by the driver.

The four resistances 41 to 44 form a single unit with four sections controlled by the accelerator pedal so that by depressing the pedal the resistances are gradually cut out, whereas resistance 36 forms a fith section of the same unit but is connected so as to be progressively inserted by depressing the pedal.

The operation of the car, in the case of four motors, is as follows: in order to start, one proceeds as in the case of a single motor, by closing from the dash-board switch 32 and slightly depressing the accelerator pedal to close switch 33. All six switches 45 - 50 are kept in position $a$, and all four motors 37 to 40 are connected to series with one another. In this stage the whole variable resistances 41 – 44 are inserted (switches 78 to 81 open) and resistor 36 is short-circuited (switch 82 closed). By further depressing the pedal, said resistances are progressively cut out, so that the speed increases. In order to obtain a further speed increase, the pedal is lifted back to the starting position, and said lever is moved to a second position to bring into position $b$ switches 47, 48. In this way the motors become connected two by two in series, and the two groups of two motors are connected in parallel with each other. By depressing the accelerator, resistances 41 to 44 are again progressively cut out. Once the resistances have been cut out, the accelerator is raised again, the lever is moved into a subsequent position, in which also switches 45, 46, 49, 50 are in position $b$, so that all four motors are connected in parallel; at this point it is possible to act again upon the accelerator to progressively cut out the variable resistances. A possible fourth position of the lever closes switches 78 to 81 and opens switch 82. Upon actuation of the accelerator, resistance 36 is progressively inserted, resulting in a decrease of the excitation current and in an increase of the motor speed.

In this way an electric speed-changing device with four speed ratios is provided, which needs no movable mechanical members, as on the contrary occurs for the present cars.

The electric speed-changing device disclosed with reference to FIG. 7 may also operate as follows:

In the first position of the lever the operation is similar to that disclosed above, with the motors connected in series. In the second position on the contrary all motors are still connected in series (all switches in position $a$) but resistors 41 to 44 are short-circuited (switches 78 to 81 closed) and actuation of the accelerator inserts resistance 36 (switch 82 open) thereby increasing the speed. In the third position the motors become connected in series - parallel (switches 47 and 48 in position $b$) and resistance 36 is again inserted; the same occurs in the fourth position, where all motors are in parallel (all switches in position b). In this way the speed change is obtained by changing the field flux of the motors and not by means of resistors serially connected with the motors, and a high efficiency is obtained at any speed condition, without high energy losses in the form of heat, except in the first position.

In case of braking, the actuation of the brake pedal after the accelerator has been released, and consequently switch 33 has opened, closes switch 34, opens switches 78 – 81 and turns the motors into generators loaded by resistors 41 to 44. Actuation of the brake pedal progressively cuts out said resistances increasing the braking action, and at low speed the normal friction brake becomes operative, as disclosed for the case of a single motor.

Also in case of descents the motor(s) may act as generator(s) allowing energy recovery and recharge of batteries without using the turbine.

When the car according to the invention is used in particular circumstances, for instance within a town zone reserved for electric traction, or wherever it is desired to limit the pollution caused by the exhaust gases of the thermal engines, the turbine 1 may be connected with a "pollution meter" 2 (FIG. 1) actuated by the turbine itself. FIGS. 8 to 12 show some preferred embodiments of the said meter.

In a first embodiment (FIGS. 8 to 10), the pollution meter may be actuated by the exhaust gases of turbine 1. The meter comprises a vane wheel 55, having a portion lying in the exhaust line 56, and actuating, when the turbine is working, a small alternator 57 which, through rectifier 58, resistor 59, Zener diode 60 and capacitor 61 feeds an electric clock 62 provided with an integrator with numerator which measures and displays on a window 79 the period in which the turbine has been operating. Resistor 59 and Zener diode 60 serve for stabilizing at a fixed value the voltage rectified by diodes 58, while capacitor 61 serves to eliminate alternating components giving a direct voltage. A switch 63, arranged between alternator 57 and rectifier 58, prevents operation of the clock when the use of the meter is not required. In order to display that the meter is operating, a signalling device which may be seen from outside may be provided, comprising for instance, as shown in FIG. 10, a colored disc 64 mounted at the end of a rod 65 which may be setup on the car body.

A possible embodiment of a control means for switch 63 and rod 65 is shown in FIG. 9.

Such a control means comprises two solenoids 66, 67 between which can move an iron core 68 integral with a shaft 69 connected through the conical gear 70 to the rod 65 carrying the colored disc 64. By operating a key placed on the dashboard the solenoid 66 may be energized, by means of current delivered by battery 7, so as to attract at its interior the core 68 when the meter is to be preset for operation; such a displacement of core 68 causes switch 63 to close and rod 65 to rise. To deenergize the meter, a second key may be provided which energizes the other solenoid thereby causing core 68 to displace in the opposite direction, and therefore rod 65 to go down and switch 63 to open.

The two positions are stable and the current passes in the solenoids only temporarily at the switching.

The whole assembly comprising the portion of the exhaust pipe 56 in which wheel 55 lies, wheel 55 itself, coils 66, 67, shaft 69 and conical gear 70 should be mounted within an envelope arranged at the interior of the car body 71 and sealed so that only rod 65 juts out. Possibly, for sake of design simplicity the conical gear may comprise only the sectors actually used.

According to a second embodiment, the pollution meter is of mechanical type, and is actuated by the fuel entering the turbine.

Such a meter comprises (FIGS. 11 and 12) a shaft 72 which is rotated by the flowing fuel and which is solid with a wheel 73 which, when the meter is preset for operation, transmits the motion, through and idle wheel 74, to a further wheel 75 which actuates the digital indicator. The idle wheel 74 is mounted at one end of an arm 76 having the other end idly mounted on shaft 69. A spring 77, having its ends respectively solid with arm 76 and core 68, keeps wheel 74 in operative position when coil 66 is energized, whereas a stud 78 keeps arm 76 in inactive position when the meter is not working. The motion is transmitted to rod 65 as it has been described above.

It is to be noted that in such a meter the rotation speed of shaft 69, and therefore the digital indication, may be made proportional to the fuel consumption of the turbine, and therefore to the power thereof, that is, after all, to the produced pollution. In the type of meter previously described the power of the turbine may be taken in account through a coefficient depending upon the type of turbine.

The pollution meter may be subjected to periodical readings and invoicings as it happens for the other private meters, such as light meters, gas meters, telephone meters and so on.

A car such as the one described has several advantages, among which the fact that in the towns, or wherever it is desired or required, the car may be propelled only electrically, so that pollution and noise are eliminated. Further, even when the turbine is working, the pollution will be lower due to the employed fuel, which moreover is cheaper than the presently used fuels. By suitably designing the turbine, the noise thereof may be reduced. Another important advantage is provided by the fact that the clutch, the shift gear, and possibly the differential gear, are eliminated, and this greatly makes up for the greater design complexity of the driving according to the invention.

Further advantages result also from the use of the motors as generators in case of braking: the electrodynamic brake thus obtained prevents wheels from becoming blocked and makes the braking more sure. Lastly the electromotors are not working during the stops caused by the traffic lights or the traffic condition, and this allows to have an energy saving and a smaller wear of the motors themselves.

What I claim is:

1. A motor vehicle with thermoelectrical drive, which comprises driving means including a thermal engine, an electric generator directly coupled through a driving shaft to said thermal engine, at least one D.C. electromotor fed by said electric generator through a set of rectifiers and providing an output for driving the vehicle, a buffer storage battery also connected to feed said D.C. electro-motor and capable of operating as an alternative to said electric generator as well as a supplement to said electric generator, meter means within a sealed housing for automatically measuring the time interval during which said turbine is operative, switch means for selectively presetting the meter means for operation, and means for displaying outside the vehicle an indication that the meter means are preset for operation.

2. A motor vehicle according to claim 1, wherein said thermal engine is a turbine operating at constant speed and at variable load.

3. A motor vehicle according to claim 1, wherein said thermal engine is a turbine operating at constant speed and constant load, an automatic regulator which acts on the excitation current of said electric generator for assuring a constant load operation, two resistors, the first being in series and the second being in parallel with the rectified output of said electric generator, and a multiplier whose inputs are the two voltage drops respectively taken across said two resistors and whose output controls said automatic regulator.

4. A motor vehicle according to claim 1 wherein said thermal engine includes a starter which is coupled to said driving shaft, and automatic coupling means between said starter and said driving shaft.

5. A motor vehicle according to claim 1, wherein said electro-motor is a single direct current motor providing the driving output for the vehicle through a differential gear.

6. A motor vehicle according to claim 1, wherein said electro-motor is a single electric motor which has a rotary armature and a rotary field, and is coupled to the driving wheels of the vehicle through two reduction units having the same gear ratio, said units being such that it is possible to reverse the motion of one of them with respect to the other.

7. A motor vehicle according to claim 1, said motor vehicle including an accelerator and brakes, wherein said motor is provided with a separately connected excitation field, an independent source of excitation coupled to said excitation field, and with a variable resistance serially connected to the motor armature, control means interconnecting the accelerator and the brake with said variable resistance in such a way as to be progressively cut out as the accelerator and the brake are progressively actuated, and wherein a further variable resistance is arranged in series with the excitation field of said motor and is controlled by said control means in such a way that it is progressively cut in by further actuating the accelerator after said serially connected resistance has been completely cut out, the progressive cut in of said further variable resistance causing a decrease of the excitation current and consequently an increase in the speed of a said motor.

8. A motor vehicle according to claim 7, wherein a first switch is serially interconnected between said variable resistance and the D.C. voltage feeding the motor and a second switch is connected in parallel with said motor, connecting means interconnecting said first and second switches with the brakes of the vehicle in such a way that the first switch is opened and the second switch is closed when the brakes are actuated, the closing of said second switch causing said motor to act as a generator loaded by said serially connected resistance.

9. A motor vehicle according to claim 8, further comprising an automatically actuated friction brake which becomes operative when the speed of the vehicle has been reduced below a certain value as a result of progressively cutting out said resistance.

* * * * *